United States Patent
Armstrong et al.

(10) Patent No.: US 10,764,311 B2
(45) Date of Patent: Sep. 1, 2020

(54) UNSUPERVISED CLASSIFICATION OF WEB TRAFFIC USERS

(71) Applicant: Cequence Security, Inc., Sunnyvale, CA (US)

(72) Inventors: Seiji Armstrong, Mountain View, CA (US); Shreyans Mehta, Los Altos, CA (US)

(73) Assignee: Cequence Security, Inc., Sunnyvale, CA (US)

(*) Notice: Subject to any disclaimer, the term of this patent is extended or adjusted under 35 U.S.C. 154(b) by 237 days.

(21) Appl. No.: 15/271,790

(22) Filed: Sep. 21, 2016

(65) Prior Publication Data

US 2018/0083994 A1    Mar. 22, 2018

(51) Int. Cl.
| | | |
|---|---|---|
| G08B 23/00 | (2006.01) | |
| G06F 12/16 | (2006.01) | |
| G06F 12/14 | (2006.01) | |
| G06F 11/00 | (2006.01) | |
| H04L 29/06 | (2006.01) | |
| H04L 29/08 | (2006.01) | |
| H04L 12/26 | (2006.01) | |

(52) U.S. Cl.
CPC .......... *H04L 63/1425* (2013.01); *H04L 69/22* (2013.01); *H04L 43/08* (2013.01); *H04L 67/02* (2013.01); *H04L 67/42* (2013.01)

(58) Field of Classification Search
CPC ..... H04L 63/1425; H04L 43/08; H04L 67/02; H04L 69/22; H04L 67/42
USPC .......................................................... 726/22
See application file for complete search history.

(56) References Cited

U.S. PATENT DOCUMENTS

| | | | |
|---|---|---|---|
| 6,704,873 B1* | 3/2004 | Underwood ............ | H04L 63/02 709/223 |
| 8,205,242 B2* | 6/2012 | Liu ......................... | H04L 63/20 726/1 |
| 8,677,487 B2 | 3/2014 | Balupari et al. | |
| 9,106,680 B2 | 8/2015 | Aplerovitch et al. | |
| 9,270,690 B2 | 2/2016 | Kraitsman et al. | |
| 9,418,546 B1* | 8/2016 | Whiting .................. | G08G 1/07 |
| 2003/0009470 A1* | 1/2003 | Leary ................ | G06F 17/30333 |
| 2010/0145935 A1* | 6/2010 | Van Steenbergen ......... | H04L 67/303 707/723 |
| 2013/0083806 A1* | 4/2013 | Suarez Fuentes .. | H04L 41/0893 370/465 |

(Continued)

OTHER PUBLICATIONS

Jun Zhang; Unsupervised traffic classification using flow statistical properties and IP packet payload; Journal of Computer and System Sciences; 2012; p. 572-585.*

(Continued)

*Primary Examiner* — Monjur Rahim

(57) ABSTRACT

Techniques to facilitate web traffic classification are disclosed herein. In at least one implementation, web traffic between a plurality of clients and at least one web server is monitored, and the web traffic is analyzed to determine attribute data points associated with each individual client of the plurality of clients. The attribute data points associated with each individual client are compared to define a plurality of client groups based on similarities in the attribute data points among each individual client. A client of the plurality of clients is identified as malicious when the client is included in more than one of the client groups.

20 Claims, 8 Drawing Sheets

(56) References Cited

U.S. PATENT DOCUMENTS

| | | | |
|---|---|---|---|
| 2013/0104230 A1* | 4/2013 | Tang | G06F 21/552 |
| | | | 726/23 |
| 2013/0317944 A1* | 11/2013 | Huang | G01S 5/0252 |
| | | | 705/26.61 |
| 2014/0075557 A1* | 3/2014 | Balabine | H04L 63/20 |
| | | | 726/23 |
| 2014/0075564 A1* | 3/2014 | Singla | H04L 63/20 |
| | | | 726/25 |
| 2014/0101759 A1 | 4/2014 | Antonakakis et al. | |
| 2014/0283061 A1* | 9/2014 | Quinlan | H04L 63/1408 |
| | | | 726/23 |
| 2014/0283067 A1 | 9/2014 | Call et al. | |
| 2015/0135262 A1 | 5/2015 | Porat et al. | |
| 2016/0027055 A1* | 1/2016 | Dixon | G06Q 30/0261 |
| | | | 705/14.58 |
| 2016/0147800 A1 | 5/2016 | Huang | |
| 2016/0226904 A1 | 8/2016 | Bartos et al. | |
| 2016/0253679 A1* | 9/2016 | Venkatraman | G06Q 30/0185 |
| | | | 705/310 |
| 2017/0124176 A1* | 5/2017 | Beznos | G06F 17/30598 |

OTHER PUBLICATIONS

Notification of Transmittal of the International Search Report and the Written Opinion of the International Searching Authority, or the Declaration for International Application No. PCT/US/2017/052641, dated Nov. 21, 2017, 8 pages.

* cited by examiner

EXEMPLARY USER-AGENT HEADER FIELDS FROM VARIOUS WEB BROWSERS

- Chrome 41
  - Mozilla/5.0 (Windows NT 6.1) AppleWebKit/537.36 (KHTML, like Gecko) Chrome/41.0.2228.0 Safari/537.36
  - Mozilla/5.0 (Macintosh; Intel Mac OS X 10_10_1) AppleWebKit/537.36 (KHTML, like Gecko) Chrome/41.0.2227.1 Safari/537.36
  - Mozilla/5.0 (X11; Linux x86_64) AppleWebKit/537.36 (KHTML, like Gecko) Chrome/41.0.2227.0 Safari/537.36
  - Mozilla/5.0 (Windows NT 6.1; WOW64) AppleWebKit/537.36 (KHTML, like Gecko) Chrome/41.0.2227.0 Safari/537.36
  - Mozilla/5.0 (Windows NT 6.3; WOW64) AppleWebKit/537.36 (KHTML, like Gecko) Chrome/41.0.2226.0 Safari/537.36
  - Mozilla/5.0 (Windows NT 6.4; WOW64) AppleWebKit/537.36 (KHTML, like Gecko) Chrome/41.0.2225.0 Safari/537.36
  - Mozilla/5.0 (Windows NT 6.3; WOW64) AppleWebKit/537.36 (KHTML, like Gecko) Chrome/41.0.2225.0 Safari/537.36
  - Mozilla/5.0 (Windows NT 5.1) AppleWebKit/537.36 (KHTML, like Gecko) Chrome/41.0.2224.3 Safari/537.36

- Internet Explorer 10.0
  - Mozilla/5.0 (compatible; MSIE 10.0; Windows NT 6.1; WOW64; Trident/6.0)
  - Mozilla/5.0 (compatible; MSIE 10.0; Windows NT 6.1; Trident/6.0)
  - Mozilla/5.0 (compatible; MSIE 10.0; Windows NT 6.1; Trident/5.0)
  - Mozilla/5.0 (compatible; MSIE 10.0; Windows NT 6.1; Trident/4.0; InfoPath.2; SV1; .NET CLR 2.0.50727; WOW64)

FIGURE 3

EXEMPLARY SECURITY PARAMETERS FROM A MODERN WEB BROWSER

- Ciphersuite: ECDHE-RSA-AES128-GCM-SHA256:ECDHE-ECDSA-AES128-GCM-SHA256:ECDHE-RSA-AES256-GCM-SHA384:ECDHE-ECDSA-AES256-GCM-SHA384:DHE-RSA-AES128-GCM-SHA256:DHE-DSS-AES128-GCM-SHA256:kEDH+AESGCM:ECDHE-RSA-AES128-SHA256:ECDHE-ECDSA-AES128-SHA256:ECDHE-RSA-AES128-SHA:ECDHE-ECDSA-AES128-SHA:ECDHE-RSA-AES256-SHA384:ECDHE-ECDSA-AES256-SHA384:ECDHE-RSA-AES256-SHA:ECDHE-ECDSA-AES256-SHA:DHE-RSA-AES128-SHA256:DHE-RSA-AES128-SHA:DHE-DSS-AES128-SHA256:DHE-RSA-AES256-SHA256:DHE-DSS-AES256-SHA:DHE-RSA-AES256-SHA:!aNULL:!eNULL:!EXPORT:!DES:!RC4:!3DES:!MD5:!PSK
- Versions: TLSv1.1, TLSv1.2
- RSA key size: 2048
- DH Parameter size: 2048
- Elliptic curves: secp256r1, secp384r1, secp521r1 (at a minimum)
- Certificate signature: SHA-256
- HSTS: max-age=15724800

FIGURE 4

UNSUPERVISED CLASSIFICATION OF WEB TRAFFIC USERS

TECHNICAL BACKGROUND

Various kinds of automated attacks are possible on web servers that provide web services, such as using stolen credentials to fraudulently access the service, brute-force attacks that try several username and password combinations to gain access, registering fake accounts, scraping websites to harvest web data, and others. Such velocity attacks typically require a large number of transactions with the web service in a very short period of time, and commonly-used web browsers are prohibitively slow for such large-scale and high-speed transactions. Instead, attackers use a wide variety of attack tools, ranging from simple shell scripts to sophisticated custom tools designed to speed up transactions.

Unfortunately, attack tools are often designed to deceive a web service into believing that the traffic is actually originating from a prevalent web browser. To achieve this subterfuge, the User-Agent header of a well-known browser may be forged in the hypertext transfer protocol (HTTP) request header of traffic originating from a malicious attack tool. Because the User-Agent string exactly matches one of the well-known web browsers, the web service and any attack-prevention techniques that rely on identifying the User-Agent string are unable to differentiate between a real web browser and a forgery, leaving the web service vulnerable to exploitation by malicious individuals employing attack tools to access the service.

OVERVIEW

Disclosed herein are techniques to facilitate web traffic classification. In at least one implementation, web traffic between a plurality of clients and at least one web server is monitored, and the web traffic is analyzed to determine attribute data points associated with each individual client of the plurality of clients. The attribute data points associated with each individual client are compared to define a plurality of client groups based on similarities in the attribute data points among each individual client. A client of the plurality of clients is identified as malicious when the client is included in more than one of the client groups.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

FIG. 3 illustrates exemplary User-Agent header fields for various web browsers.

FIG. 4 illustrates exemplary security parameters from a modern web browser.

DETAILED DESCRIPTION

Figure 1:
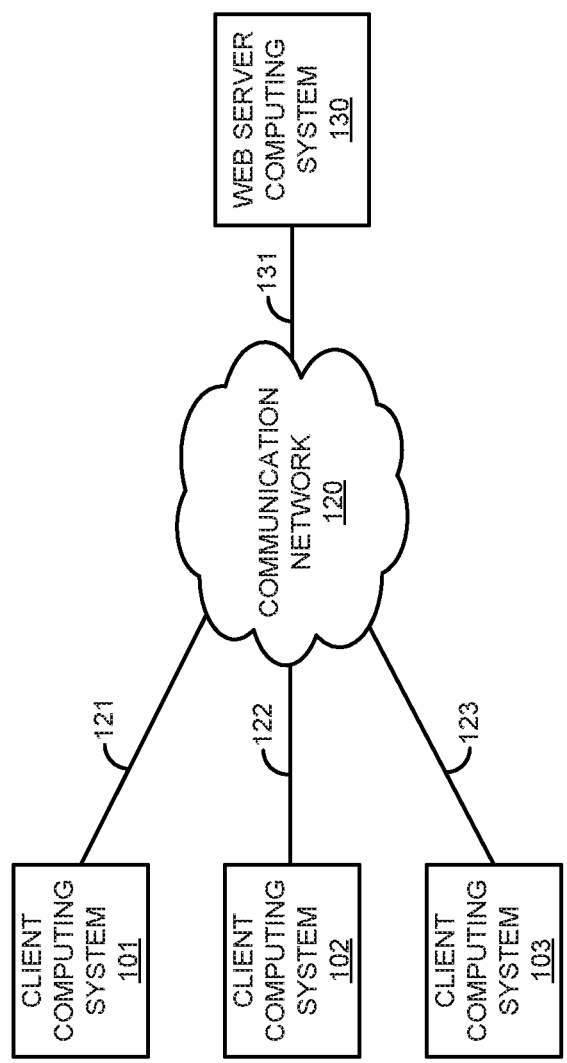
FIG. 1 is a block diagram that illustrates a communication system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Some security technologies detect a forged browser by actively injecting JavaScript code or modifying the pages being served by the web service as part of the web server's response to client requests. The web server can then use the results of the JavaScript execution to determine whether or not the client making the requests is actually a genuine web browser. However, this technique requires integration within the web service or operating in-line with the web service, which may involve additional development on the web service and may adversely affect its performance due to active modification of the pages being served. The following disclosure enables passive detection of malicious activity without any active page modification.

There are many attributes associated with a user interacting with a web server. However, if the user is employing a malicious automation tool to attack the web service, some of these attributes may be modified in order to appear as legitimate traffic, such as traffic originating from a well-known web browser. For example, malicious automation tools might change the most visible attributes in order to pose as legitimate traffic, but inspection of less visible layers could reveal the true identity of the user. One approach to detecting these malicious users involves the discovery of inconsistencies between these attributes. However, keeping track of the numerous variations between attributes belonging to legitimate web traffic can be arduous and intensive.

Implementations disclosed herein provide unsupervised web traffic classification to facilitate detection of malicious users. In at least one implementation, web traffic is monitored between client systems and a web server. The web traffic is then analyzed to determine attributes associated with each individual client. The different clients are then grouped together based on the similarity of their various attributes. The grouping is performed such that the differences between the groups are maximized, thereby greatly improving the classification and detection of malicious automation tools. The grouping process is unsupervised and may be automated and updated dynamically when unknown clients are introduced. Inclusion of a client in more than one group is evidence of tampering with one or more attributes, which is indicative of a user with malicious intent.

Referring now to FIG. 1, a block diagram of communication system 100 is illustrated. Communication system 100 includes client computing systems 101, 102, and 103, communication network 120, and web server computing system 130. Client computing system 101 and communication network 120 communicate over communication link 121. Likewise, client computing system 102 and communication network 120 communicate over communication link 122. Client computing system 103 and communication network 120 communicate over communication link 123. Communication network 120 and web server computing system 130 are in communication over communication link 131. Note that most modern communication systems would typically include many more client computing systems 101-103, but only three are shown in FIG. 1 to simplify this discussion.

In operation, the client computing systems 101-103 submit HTTP requests and exchange web traffic with web server 130. Various aspects of the web traffic and the HTTP requests can then be analyzed by web server 130 or some other processing system to determine attribute data points for each client 101-103 that describe the particular form and content of the HTTP request, connection behavior and interactions with server 130 during the HTTP request, and any other attributes that uniquely identify the web traffic and HTTP requests. There are thousands of variations of attributes that legitimate traffic might exhibit, and the attributes can be processed to identify correlations and patterns among these variations. These correlations and patterns can be exploited in order to classify web clients by grouping them together based on a similarity metric. Various attributes associated with each web client are processed to determine group membership for each client. A client belonging to more than one group is evidence of tampering with one or more attributes, which is indicative of a user with malicious intent. An exemplary implementation to facilitate web traffic classification will now be discussed with respect to FIG. 2.

Figure 2:
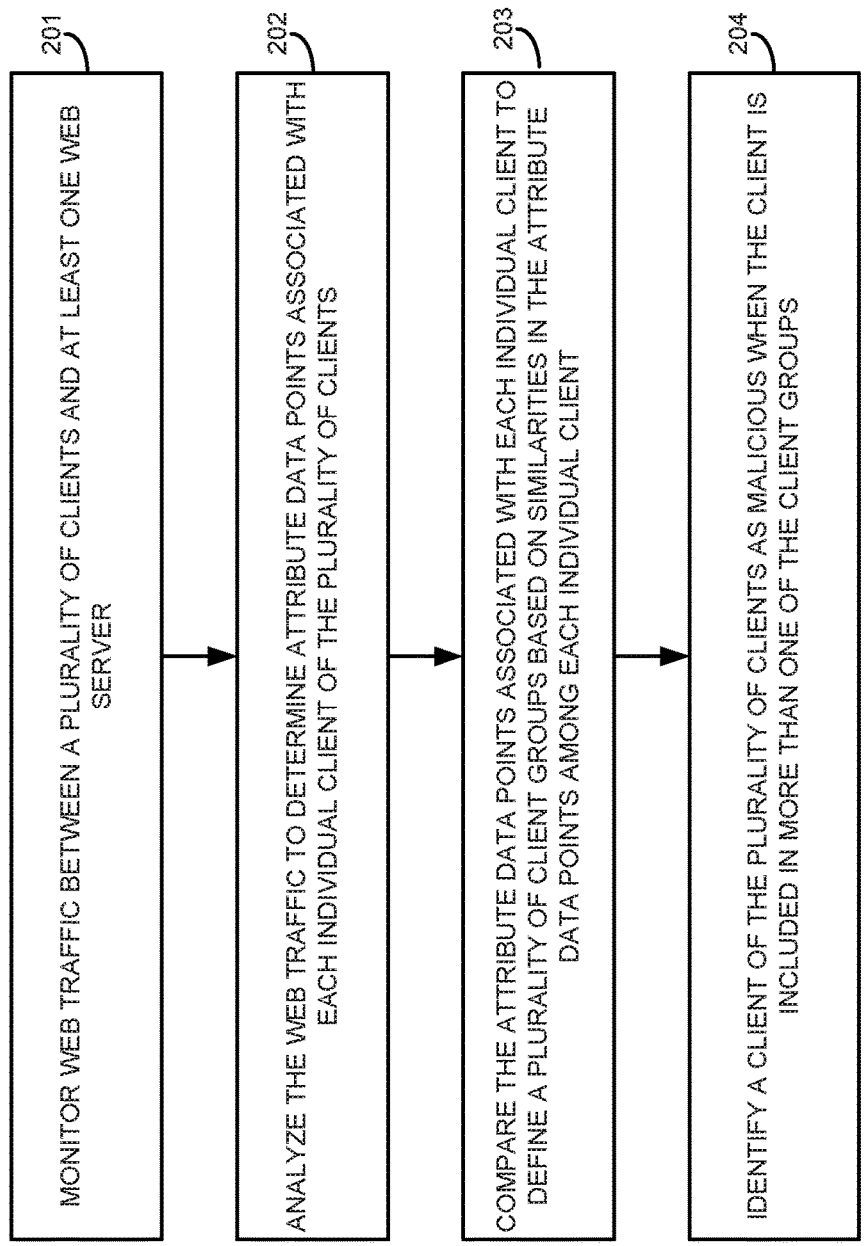
FIG. 2 is a flow diagram that illustrates an operation of the communication system.

FIG. 2 is a flow diagram that illustrates an operation 200 of communication system 100. The operation 200 shown in FIG. 2 may also be referred to as classification process 200 herein. The steps of the operation are indicated below parenthetically. The following discussion of operation 200 will proceed with reference to client computing systems 101-103 and web server 130 of FIG. 1 in order to illustrate its operations, but note that the details provided in FIG. 1 are merely exemplary and not intended to limit the scope of process 200 to the specific implementation shown in FIG. 1.

Operation 200 may be employed by computing system 130 to facilitate web traffic classification. As shown in the operational flow of FIG. 2, computing system 130 monitors web traffic between a plurality of clients 101-103 and at least one web server 130 (201). Clients 101-103 comprise computing systems executing any application that interacts with web server 130, such as a genuine web browser, attack tools such as a script or bot, or any other software program. Web server 130 typically provides a web service to clients 101-103, which could comprise any service that may be available over a communication network, such as file transfers, streaming media, email, financial services, e-commerce, social media, online gaming services, or any other web service, including combinations thereof. In this example, the web traffic is both hosted and monitored by server computing system 130, although the web traffic could be provided and/or monitored by a different computing system in some implementations. The web traffic monitored between web server 130 and clients 101-103 includes hypertext transfer protocol (HTTP) requests transmitted by clients 101-103 and HTTP responses from web server 130, which typically include payload data requested by clients 101-103.

Computing system 130 analyzes the web traffic to determine attribute data points associated with each individual client of the plurality of clients 101-103 (202). The attribute data points for clients 101-103 describe the unique form and content of any HTTP requests in the web traffic, fields in the HTTP request headers transmitted by clients 101-103, the connection behavior of clients 101-103 when interacting with web server 130, security parameters and other information exchanged between clients 101-103 and web server 130, and any other attributes associated with the web traffic. In at least one implementation, computing system 130 could analyze the web traffic to determine the attribute data points by analyzing the web traffic to determine fields in individual HTTP request headers transmitted by each individual client of the plurality of clients 101-103. Computing system 130 could also determine an order of the fields listed in each of the individual HTTP request headers transmitted by each individual client 101-103 and include this information in the attribute data points associated with each individual client 101-103. The presence or absence of different header fields, the order the fields are listed in the header, and the content of the fields can all be used to generate attribute data points for each respective client 101-103. For example, an HTTP request sent by client computing system 101 may include multiple header fields such as Host, Accept, and Accept-Encoding, among others. Some of these fields are optional and therefore will not always be included in an HTTP request header. Thus, the particular fields that client 101 includes in the HTTP request header may be factored in when analyzing the web traffic to determine the attribute data points associated with client 101. In other words, the attribute data points could be partly based on what fields are included in the HTTP request header. Further, different web browsers and even different versions of the same web browser may arrange these fields in different orders in the header. Thus, in some implementations, computing system 130 could generate the attribute data points for client 101, in part, based on an order or arrangement of the fields in the HTTP request header transmitted by the client 101. Accordingly, the attribute data points could be based on which of the fields are included in the HTTP request header, the order in which the fields are listed, and the content provided in the fields.

The values in the HTTP header fields are also driven by the capabilities of the web browsers and their implementation preferences, and computing system 130 could analyze the web traffic to determine the attribute data points for a particular client 101 based on capabilities supported by client 101 as indicated in the fields in the HTTP request header. For example, some browsers choose to expose the Accept-Encoding header field as one or more values from gzip, compress, deflate, and the like, depending on the capabilities available in the browser on a given platform, while other browsers may choose to completely forego including the Accept-Encoding header field altogether. The protocols, languages, and other features that the browser supports may also be listed in the HTTP header fields, such as support for various scripting languages, Flash® media, compression algorithms, and others. Moreover, as browsers release new versions, they include newer capabilities as well. For example, a default protocol version (i.e., 1.0, 1.1, 2.0) to use for the request may be continually updated in newer release versions of a browser, so computing system 130 could determine attribute data points for client 101 based on the default protocol version indicated in the HTTP request header. Further, new fields like Do Not Track (DNT) may be introduced in newer versions of a browser that were not present in older versions. Any of this kind of capability information that may be included in the HTTP request header could be used by web server 130 to determine attribute data points for client 101.

In addition to the HTTP layer, computing system 130 may also consider security information in the secure socket layer (SSL). For example, a hypertext transfer protocol secure (HTTPS) session using SSL established between web server 130 and a client 101 typically includes various session configuration data and security parameters, such as protocol versions, session identifiers, cipher suites, compression methods, random values, and other session setup information. The particular cipher suites listed, the total number of cipher suites included, the order of the cipher suites, and other attributes of the security information transmitted by client 101 during HTTPS session establishment can be used to generate attribute data points that help provide a unique signature of client 101, which is typically distinctive for each different type of legitimate web browser and other types of client applications. For example, different web browsers and even different versions of the same web browser may include different cipher suites in the list, and may arrange and order the cipher suites and other security information differently. Essentially, any nuances in the content, manner, and format in which a client 101 presents security parameters and other information during HTTPS session establishment with web server 130 can be used to determine attribute data points for that client 101 which help to provide a unique fingerprint of client 101.

In some implementations, analyzing the web traffic to determine the attribute data points could comprise analyzing the web traffic to determine connection behavior between each individual client of the plurality of clients 101-103 and the at least one web server 130. For example, web server 130 may monitor the connection behavior of web client 101 with web server 130 for use in generating the attribute data points for client 101. Web browsers may interact with a web server in different ways. For example, some browsers choose to send multiple HTTP requests in the same transmission control protocol (TCP) connection, while others create a new connection for every request. Some browsers send multiple requests in the same connection even before they start receiving responses from the server, while others wait to send subsequent requests in the same connection until a response to an initial request on that connection is returned. Thus, in some implementations, web server 130 could determine the attribute data points for client 101 based on whether or not client 101 sends multiple HTTP requests over a same connection to web server 130. In some examples, determining the connection behavior of client 101 can also include monitoring how client 101 responds to requests from web server 130, such as observing how client 101 responds to a request from web server 130 to fall back to an older protocol version. Further, the attribute data points could indicate user behavior observed when a particular client 101 accesses the web service provided by web server 130, such as the timing of clicks, keystrokes, and other user inputs, page navigations, page scrolling, content requests, and the like.

In certain cases, browsers may choose to keep a connection or multiple connections open for a period of time, even if there are no active requests or responses in transit. In other words, the length of time that a connection persists, even though no data may be flowing over that connection, can differ between different types of web browsers. Accordingly, the attribute data points for a particular client 101 may be determined based on a length of time that client 101 maintains a connection with web server 130. Other behavior of client 101 could be determined as well, such as the order and manner in which client 101 parses the hypertext markup language (HTML) and other code when fetching a web page. For example, when parsing HTML, some browsers will parse hyperlinks and other textual content in a different way than images or video, such as fetching all images first, or processing all JavaScript code first before fetching images, or fetching images with a different connection than other page content, and any other nuances in HTML parsing and page fetching. Any of the above information in the web traffic, such as the HTTP header fields, connection behavior, and other data that can be observed from the interactions of client systems 101-103 with web server 130 can be used to generate the attribute data points associated with each individual client 101-103 that effectively provides a unique fingerprint or signature of how each client 101-103 is operating.

Computing system 130 compares the attribute data points associated with each individual client 101-103 to define a plurality of client groups based on similarities in the attribute data points among each individual client (203). For example, computing system 130 may employ a similarity metric to define the client groups by comparing the attribute data points and grouping clients together that have similar attribute data points. For example, in at least one implementation, comparing the attribute data points to define the plurality of client groups could comprise determining an order of the fields listed in each of the individual HTTP request headers transmitted by each individual client and grouping individual clients of the plurality of clients 101-103 associated with ones of the individual HTTP request headers having similarly ordered fields to define the plurality of client groups. In some examples, the attribute data points for each client 101-103 could be processed to generate unique fingerprints for each individual client 101-103, where the fingerprints comprise numerical vectors in multidimensional space generated by encoding the attribute data points associated with each respective client 101-103. Thus, in some implementations, comparing the attribute data points to define the plurality of client groups could comprise generating individual fingerprints for each individual client 101-103 by encoding the attribute data points associated with each individual client 101-103 into numerical vectors for each individual client and processing the individual fingerprints to define the plurality of client groups. In some examples, attributes may appear similar between two different clients at a particular layer, such as the transport layer or the session layer, but deeper analysis and comparison of the fingerprints may reveal differences in the attributes at the data link layer or the network layer.

In at least one implementation, processing the individual fingerprints to define the plurality of client groups may comprise calculating distances between the numerical vectors in multidimensional space and grouping the individual fingerprints based on the distances between the numerical vectors. For example, a numerical vector generated by encoding the attribute data points associated with a particular client 101 could be plotted along with other vectors in multidimensional space, and the distance between each numerical vector can be computed using a stand metric such as the Euclidean distance. The calculated distances between the vectors in multidimensional space can then be used to define the client groups based on grouping proximate vectors. Thus, in some implementations, grouping the individual fingerprints based on the distances between the numerical vectors could comprise grouping the individual fingerprints based on the distances between the numerical vectors falling within a proximity threshold. For example, different groups may be identified where multiple clients have similar attributes appearing in clusters on the vector plots that fall within the proximity threshold. The proximity threshold could be adjusted to provide for different levels of security in some examples. For example, the thresholds could be set on a per-client basis according to the level of security desired, but they are ideally set to accurately identify malicious users while also avoiding any misclassification of valid users as malicious by mistakenly including them in multiple groups.

Computing system 130 identifies a client of the plurality of clients 101-103 as malicious when the client is included in more than one of the client groups (204). If a client does not have any modified attributes, that client will only belong to one client group. However, if a malicious user modifies any attributes, the techniques disclosed herein will ensure that the user will belong to more than one group, and can therefore be flagged as suspicious. Computing system 130 is thus able to identify one of the clients 101-103 as malicious when a particular client is a member of multiple client groups.

Advantageously, web server computing system 130 is capable of unsupervised web traffic classification. By passively monitoring web traffic and interactions between clients 101-103 and web server 130 to generate attribute data points for the clients 101-103, computing system 130 is able to compare the attribute data points among the different clients 101-103 to define groups of different clients based on similarity metrics. Computing system 130 can then discover potentially malicious clients by identifying clients that belong to more than one group. Accordingly, by detecting malicious clients and eliminating their illegitimate requests from forged web browsers and other malicious attack tools, the techniques described herein provide the technical advantage of reducing the load on the processor, network components, and other elements of web server 130, while also safeguarding the information of users of the web service. In this manner, web server 130 can positively identify potentially malicious clients and effectively thwart attacks on the web service from automation tools and other malware.

Referring now to FIG. 3, exemplary User-Agent header fields are shown for various web browsers. Every well-known web browser exposes the Browser Name, Version, and Platform combination through the User-Agent header field. FIG. 3 provides a few examples of this User-Agent field from various browsers. Attack tools often copy and use the User-Agent string from prevalent web browsers in their own HTTP request headers to disguise themselves as those browsers. However, such attack tools typically fail to replicate all of the behavioral characteristics of the real web browsers they are trying to emulate, and these inconsistencies can be used to detect applications, scripts, and other malicious automation tools that are trying to hold themselves out as prevalent browsers.

In some examples, additionally or alternatively to comparing attributes for unknown clients in an uncontrolled environment, a trusted learning environment may be employed where the traffic being sent between the computing devices and the web server is controlled. This environment can be used to automatically learn all of the subtle behavioral differences for every well-known web browser and its various incremental version releases. In particular, a known web browser to be analyzed is loaded onto a computing device and controlled traffic is exchanged with the web server while monitoring all of the default behavior of the browser. The information monitored includes the various fields in the HTTP request headers sent by the browser, including which fields are provided, the order that the fields are presented, which protocols, languages, tools, and other features the browser supports, and any other information in the HTTP headers that may be uniquely associated with the web browser. Other behavior is also tested and observed, such as the protocol version (i.e., HTTP version) that the browser uses to perform the initial handshake with the web server, or the manner in which the web browser responds to a request from the web server to fall back to an older protocol version than the browser used initially.

The connection behavior of the browser is also recorded, such as whether the browser sends multiple HTTP requests in the same connection or opens a new connection for each request. Other connectivity behavior that could be tested is whether the browser sends multiple requests in the same connection before ever receiving a response from the web server, or whether the browser waits for a response to an initial request before sending subsequent requests. The length of time that the connection or connections persist is also measured, which may remain open for some period of time even though no data is flowing between the endpoints. The manner and order in which elements of a web page (i.e., text, hyperlinks, images, videos, advertisements, JavaScript, and other page content) are fetched by the browser when parsing the HTML code of a web page are also tracked, including whether or not the browser creates new connections to fetch each of the various different page elements.

In this manner, all HTTP request and response traffic is passively monitored, and these static and dynamic behaviors are then mapped back to the actual web browsers under their respective User-Agent string and stored as attribute data points for later comparison. Unique fingerprints can then be generated for each web browser type by encoding the attribute data points associated with a particular browser into a high-dimensional numerical vector. New behaviors of new versions of prevalent web browsers are continuously learned in this environment as they are released, ensuring the database remains current, relevant, and effective. New behaviors of web browsers can also be added to their attribute data points as they are learned, which can be observed from the browsers' behavior as they access different websites, different pages and file types (i.e., HTML, images, text, scripts, and others), and make different types of HTTP requests (i.e., GET, HEAD, POST, and the like).

In addition to observing the various different web browser interactions, known attack tools may also run in the trusted test environment. In this case, even though the attack tools may be fraudulently manipulating the User-Agent string, this controlled test environment provides for tracking the traffic from the attack tools to learn their behavior and observe how it differs from the genuine web browsers they are imitating. This information can aid in identifying when a particular attack tool is being used, which helps strengthen the determination that the traffic is not coming from a genuine web browser. After amassing the data as described above for all well-known web browsers and their various release versions, the system can operate in an untrusted environment with a mixture of real and forged browsers and monitor the web traffic of the clients. By passively monitoring the web traffic between the clients and the web server to generate attribute data points for each of the clients, the system is then able to compare the attribute data points among the clients to define groups of different clients based on similarities in the attribute data points among each individual client. Potentially malicious clients can then be discovered by identifying clients that belong to more than one group.

Referring now to FIG. 4, exemplary security parameters are shown from a modern web browser. FIG. 4 provides an example of security parameters from a web browser that may be included in the 'Client Hello' message sent to the server during secure session establishment. Some examples of modern web browsers that may present such security parameters include Firefox 27, Chrome 22, Opera 14, Safari 7, and Internet Explorer 11. However, note that the list of cipher suites supported by each browser will be different, along with the order that each browser presents the cipher suites in the list. For example, there may be a greater number of cipher suites included in the security parameters for older web browser versions than those shown in FIG. 4 for a more modern browser, because the older browser version may include older cipher suites that are no longer supported by the more modern browser shown in the example of FIG. 4.

The various security parameters shown in FIG. 4 demonstrate the different cipher suites supported by the browser, the number of cipher suites, the order of the cipher suites, and the other security information that may be part of a 'Client Hello' message sent during secure session establishment, such as the transport layer security (TLS) or SSL protocol versions, RSA key size, Diffie-Hellman (DH) parameter size, elliptical curves, certificate signature, HTTP Strict Transport Security (HSTS) values, and others. These various different security attributes that may be sent by a client to establish a secure session with a web server can be used along with any other information to generate a unique fingerprint for identifying a particular browser. These signatures are unique for each different type of web browser.

Most malicious attackers use automated tools to target web servers. When a web server is HTTPS enabled, the attackers are forced to use HTTPS as well. The security signature of an attack tool will be very different from the security signature of a real web browser. The techniques disclosed herein to determine attribute data points for various clients can utilize these differences in the security signatures of the clients as part of determining an overall fingerprint for each client, which can then be compared with the fingerprints of other clients to determine the group or groups to which the client belongs. When a client is a member of more than one group, this is evidence of tampering with parameters and malicious intent, thereby enabling the system to identify and block the malicious traffic before it can cause any harm. An example of this grouping mechanism will now be discussed with respect to FIGS. 5-7.

Figure 5:
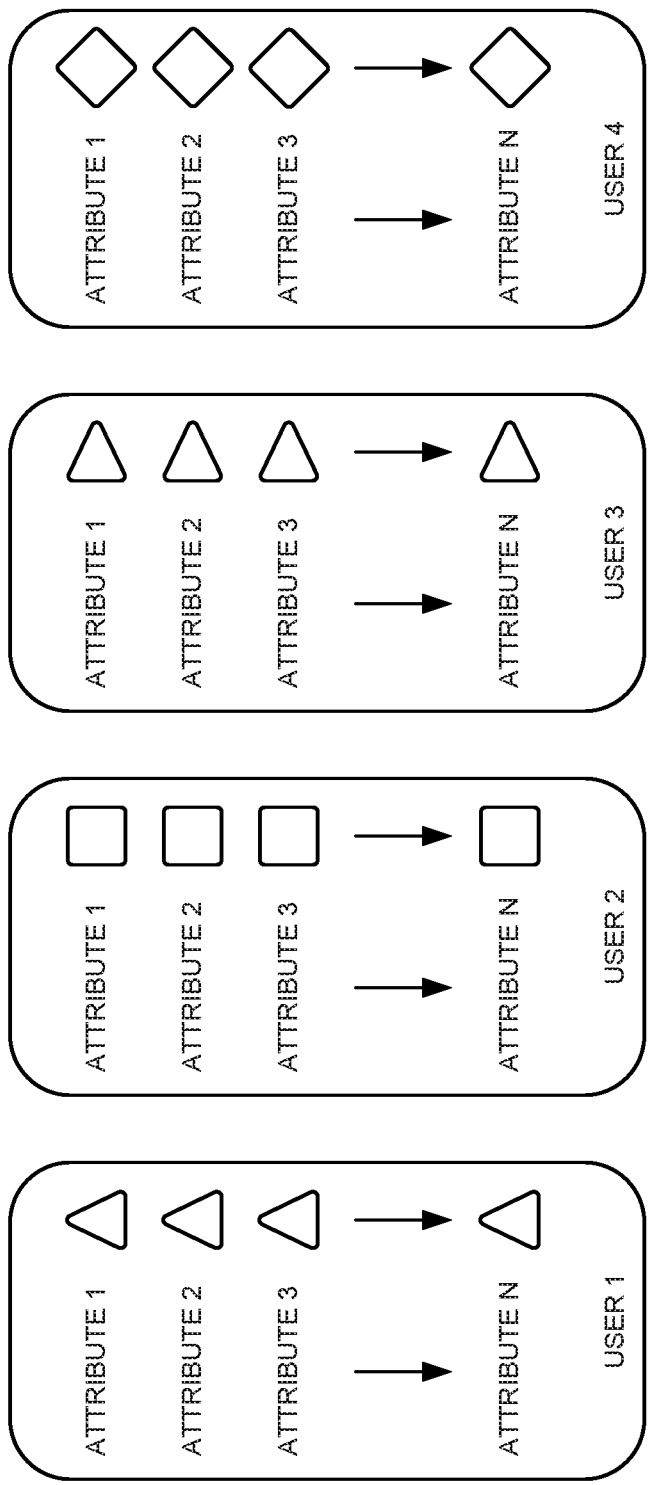
FIG. 5 is a block diagram that illustrates an exemplary representation of user fingerprints having various attributes.

FIG. 5 is a block diagram that illustrates an exemplary representation of user fingerprints having various attributes. The lists of attributes for each user provide an abstract representation of the unique fingerprint of each user. In this example, each fingerprint contains N attributes. The attributes for users 1 and 3 are represented abstractly as triangle shapes, whereas the attributes for users 2 and 4 are represented as squares, and these similarities in attributes may be used to group the users accordingly. Note that the shapes shown for the attributes in FIG. 5 are merely provided as an abstraction to represent the similarities or differences between the various attributes for the purpose of facilitating this discussion.

Figure 6:
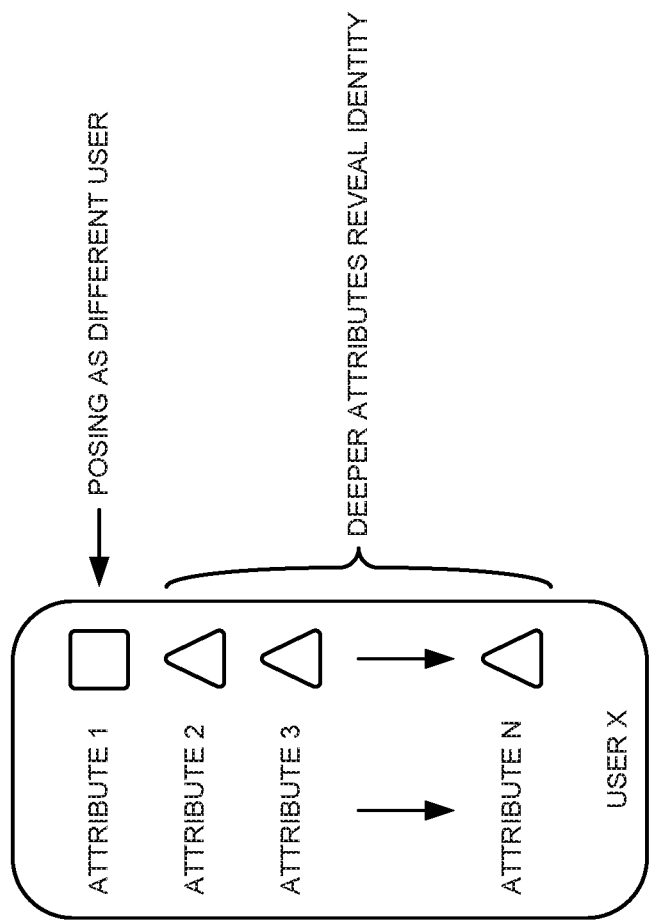
FIG. 6 is a block diagram that illustrates an exemplary representation of a user fingerprint having a modified attribute.

FIG. 6 is a block diagram that illustrates an exemplary representation of a user fingerprint having a modified attribute. In this example, the attributes observed for 'User X' are shown, who has tampered with attribute 1. The other attributes have not been modified. Thus, although the first attribute has been altered to appear like the "square" attributes of User 2 shown in FIG. 5, the other attributes reveal the true identity of the client, which are similar to the triangular-shaped attributes of User 1 of FIG. 5. The different attributes appearing in the fingerprint of "User X" suggest that the user is using the same or similar client application as User 1 since most of their attributes are represented abstractly as triangles, but with attribute 1 having been modified to imitate the client application of User 2 having the square-shaped attributes. An example of how these users may be grouped together will now be discussed with respect to FIG. 7.

Figure 7:
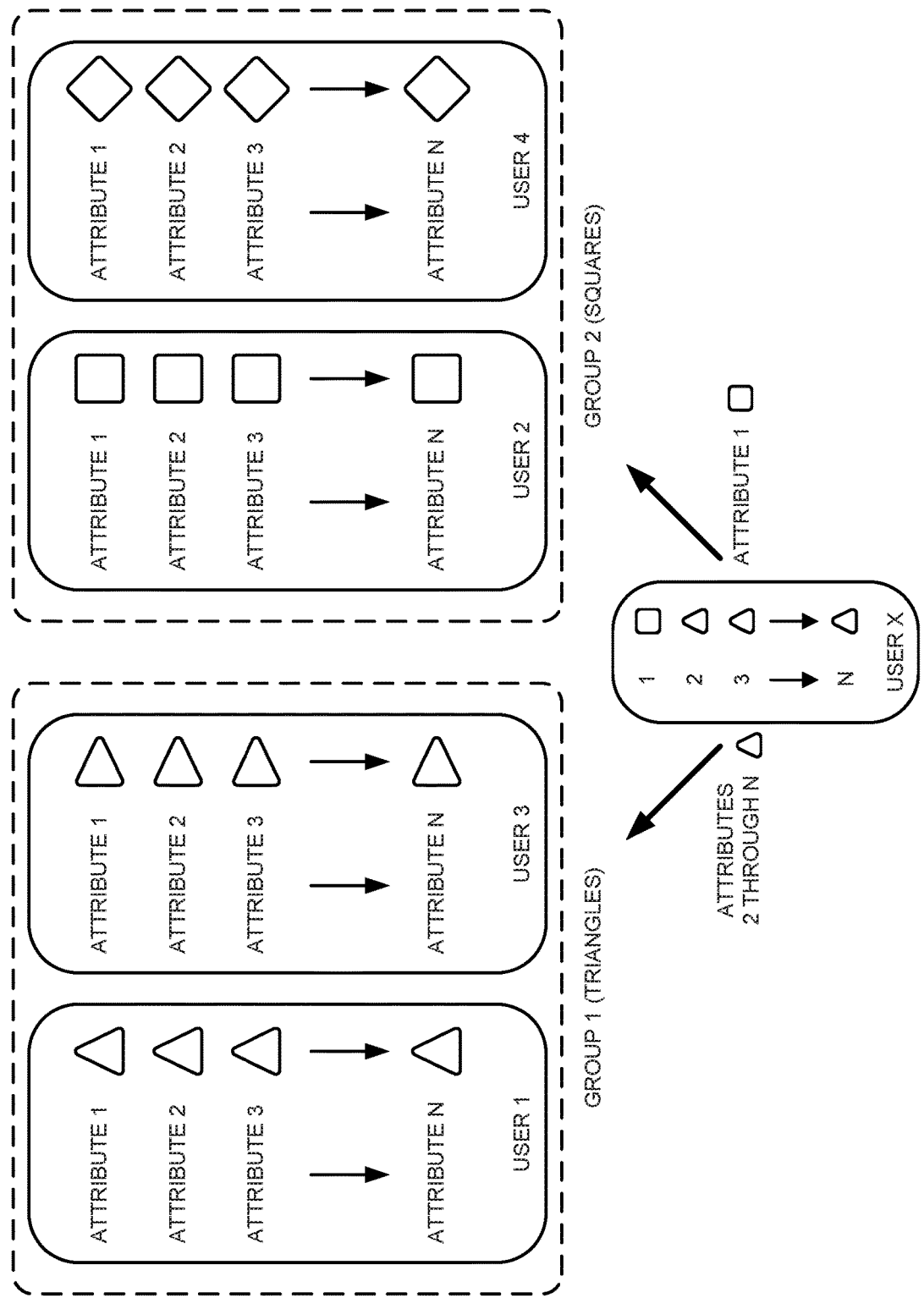
FIG. 7 is a block diagram that illustrates an exemplary representation of grouping user fingerprints having similar attributes.

FIG. 7 is a block diagram that illustrates an exemplary representation of grouping user fingerprints having similar attributes. In this example, users 1 and 3 are grouped together into 'Group 1' due to their having similar triangle-shaped attributes, and users 2 and 4 are in 'Group 2' based on their sharing similar squared-shaped attributes. However, 'User X', who has modified attribute 1, will now belong to both groups. In particular, because attributes 2 through N shown for User X are similar to the triangular attributes of Group 1, User X will be included in Group 1. However, User X will also be included in Group 2 based on having the modified attribute 1 which is similar to the square attributes of Group 2. The inclusion of User X in both groups is indicative of malicious intent, and appropriate security precautions can then be taken to safeguard the web service from any malicious actions that may be attempted by User X.

The security techniques described above provide for unsupervised classification of web traffic users into groups to facilitate identification of malicious users. By grouping different users based on the similarity of their web traffic attributes, the system can passively identify attempts to access the web service with attack tools masquerading as real browsers, thereby ensuring that a web service is only accessed by legitimate web browsers. Any suspicious activity that deviates from the typical behavior of a legitimate web browser will be exposed through the inclusion of that client in multiple groups and can be flagged and blocked, thereby providing improved defenses against malicious users.

Now referring back to FIG. 1, client computing systems 101-103 each individually comprise a processing system and communication transceiver. Computing systems 101-103 may also include other components such as a user interface, data storage system, and power supply. Computing systems 101-103 may reside in a single device or may be distributed across multiple devices. Examples of computing systems 101-103 include mobile computing devices, such as cell phones, tablet computers, laptop computers, notebook computers, and gaming devices, as well as any other type of mobile computing devices and any combination or variation thereof. Examples of computing systems 101-103 also include desktop computers, server computers, and virtual machines, as well as any other type of computing system, variation, or combination thereof.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Web server computing system 130 may be representative of any computing apparatus, system, or systems on which the techniques disclosed herein or variations thereof may be suitably implemented. Web server computing system 130 comprises a processing system and communication transceiver. Web server computing system 130 may also include other components such as a router, server, data storage system, and power supply. Web server computing system 130 may reside in a single device or may be distributed across multiple devices. Web server computing system 130 may be a discrete system or may be integrated within other systems, including other systems within communication system 100. Some examples of web server computing system 130 include desktop computers, server computers, cloud computing platforms, and virtual machines, as well as any other type of computing system, variation, or combination thereof. In some examples, web server computing system 130 could comprise a network switch, router, switching system, packet gateway, network gateway system, Internet access node, application server, database system, service node, firewall, or some other communication system, including combinations thereof.

Communication links 121-123 and 131 use metal, air, space, optical fiber such as glass or plastic, or some other material as the transport medium—including combinations thereof. Communication links 121-123 and 131 could use various communication protocols, such as TDM, IP, Ethernet, telephony, optical networking, hybrid fiber coax (HFC), communication signaling, wireless protocols, or some other communication format, including combinations thereof. Communication links 121-123 and 131 could be direct links or may include intermediate networks, systems, or devices.

Figure 8:
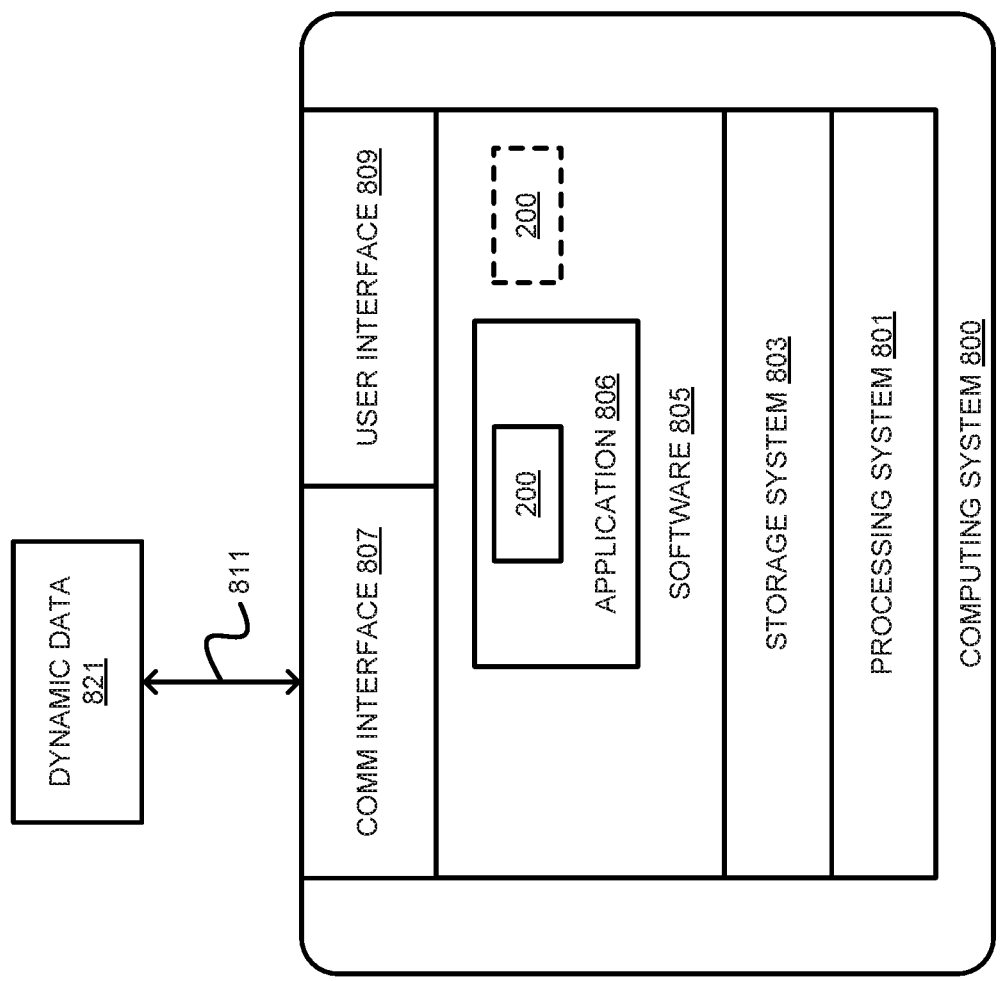
FIG. 8 is a block diagram that illustrates a computing system.

Referring now to FIG. 8, a block diagram that illustrates computing system 800 in an exemplary implementation is shown. Computing system 800 provides an example of web server 130, although server 130 could use alternative configurations. Computing system 800 could also provide an example of client computing systems 101-103, although systems 101-103 could use alternative configurations. Computing system 800 includes processing system 801, storage system 803, software 805, communication interface 807, and user interface 809. Software 805 includes application 806 which itself includes classification process 200. Classification process 200 may optionally be implemented separately from application 806.

Computing system 800 may be representative of any computing apparatus, system, or systems on which application 806 and classification process 200 or variations thereof may be suitably implemented. Examples of computing system 800 include mobile computing devices, such as cell phones, tablet computers, laptop computers, notebook computers, and gaming devices, as well as any other type of mobile computing devices and any combination or variation thereof. Note that the features and functionality of computing system 800 may apply as well to desktop computers, server computers, and virtual machines, as well as any other type of computing system, variation, or combination thereof.

Computing system 800 includes processing system 801, storage system 803, software 805, communication interface 807, and user interface 809. Processing system 801 is operatively coupled with storage system 803, communication interface 807, and user interface 809. Processing system 801 loads and executes software 805 from storage system 803. When executed by computing system 800 in general, and processing system 801 in particular, software 805 directs computing system 800 to operate as described herein for web server 130 for execution of classification process 200 or variations thereof. Computing system 800 may optionally include additional devices, features, or functionality not discussed herein for purposes of brevity.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer-readable media or storage media readable by processing system 801 and capable of storing software 805. Storage system 803 may include volatile and nonvolatile, removable and non-removable media implemented in any method or technology for storage of information, such as computer-readable instructions, data structures, program modules, or other data. Storage system 803 may be implemented as a single storage device but may also be implemented across multiple storage devices or sub-systems co-located or distributed relative to each other. Storage system 803 may comprise additional elements, such as a controller, capable of communicating with processing system 801. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, processing system 801 loads and executes portions of software 805, such as application 806 and/or classification process 200, to facilitate web traffic classification. Software 805 may be implemented in program instructions and among other functions may, when executed by computing system 800 in general or processing system 801 in particular, direct computing system 800 or processing system 801 to monitor web traffic between a plurality of clients and at least one web server, and analyze the web traffic to determine attribute data points associated with each individual client of the plurality of clients. Software 805 further directs computing system 800 or processing system 801 to compare the attribute data points associated with each individual client to define a plurality of client groups based on similarities in the attribute data points among each individual client. Software 805 may also direct computing system 800 or processing system 801 to identify a client of the plurality of clients as malicious when the client is included in more than one of the client groups.

Software 805 may include additional processes, programs, or components, such as operating system software or other application software. Examples of operating systems include Windows®, iOS®, and Android®, as well as any other suitable operating system. Software 805 may also comprise firmware or some other form of machine-readable processing instructions executable by processing system 801.

In general, software 805 may, when loaded into processing system 801 and executed, transform computing system 800 overall from a general-purpose computing system into a special-purpose computing system customized to facilitate web traffic classification as described herein for each implementation. For example, encoding software 805 on storage system 803 may transform the physical structure of storage system 803. The specific transformation of the physical structure may depend on various factors in different implementations of this description. Examples of such factors may include, but are not limited to the technology used to implement the storage media of storage system 803 and whether the computer-storage media are characterized as primary or secondary storage.

In some examples, if the computer-storage media are implemented as semiconductor-based memory, software 805 may transform the physical state of the semiconductor memory when the program is encoded therein. For example, software 805 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 800 is generally intended to represent a computing system with which software 805 is deployed and executed in order to implement application 806, classification process 200, and variations thereof. However, computing system 800 may also represent any computing system on which software 805 may be staged and from where software 805 may be distributed, transported, downloaded, or otherwise provided to yet another computing system for deployment and execution, or yet additional distribution. For example, computing system 800 could be configured to deploy software 805 over the internet to one or more client computing systems for execution thereon, such as in a cloud-based deployment scenario.

Communication interface 807 may include communication connections and devices that allow for communication between computing system 800 and other computing systems (not shown) or services, over a communication network 811 or collection of networks. In some implementations, communication interface 807 receives dynamic data 821 over communication network 811. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 809 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 809. In some examples, user interface 809 could include a touch screen capable of displaying a graphical user interface that also accepts user inputs via touches on its surface. The aforementioned user input devices are well known in the art and need not be discussed at length here. User interface 809 may also include associated user interface software executable by processing system 801 in support of the various user input and output devices discussed above. Separately or in conjunction with each other and other hardware and software elements, the user interface software and devices may provide a graphical user interface, a natural user interface, or any other kind of user interface. User interface 809 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate web traffic classification, the method comprising:
   monitoring web traffic between a plurality of clients and at least one web server;
   analyzing the web traffic to determine attribute data points associated with each individual client of the plurality of clients;
   creating a plurality of client groups by comparing the attribute data points associated with each individual client, wherein the plurality of client groups are created based on similarities in the attribute data points among each individual client to allow classification and detection of malicious automation tools;
   assigning each individual client of the plurality of clients to one or more of the plurality of client groups;
   identifying a client of the plurality of clients as malicious when the client is included in more than one of the plurality of client groups; and
   blocking the client identified as malicious from connection to the at least one web server.

2. The method of claim 1 wherein comparing the attribute data points to define the plurality of client groups comprises generating individual fingerprints for each individual client by encoding the attribute data points associated with each individual client into numerical vectors for each individual client and processing the individual fingerprints to define the plurality of client groups.

3. The method of claim 2 wherein processing the individual fingerprints to define the plurality of client groups comprises calculating distances between the numerical vectors in multidimensional space and grouping the individual fingerprints based on the distances between the numerical vectors.

4. The method of claim 3 wherein grouping the individual fingerprints based on the distances between the numerical vectors comprises grouping the individual fingerprints based on the distances between the numerical vectors falling within a proximity threshold.

5. The method of claim 1 wherein analyzing the web traffic to determine the attribute data points comprises analyzing the web traffic to determine fields in individual hypertext transport protocol (HTTP) request headers transmitted by each individual client of the plurality of clients or analyzing the web traffic to determine connection behavior between each individual client of the plurality of clients and the at least one web server.

6. The method of claim 5 wherein comparing the attribute data points to define the plurality of client groups comprises determining an order of the fields listed in each of the individual HTTP request headers transmitted by each individual client and grouping individual clients of the plurality of clients associated with ones of the individual HTTP request headers having similarly ordered fields to define the plurality of client groups.

7. The method of claim 1 wherein the plurality of client groups are created by maximizing differences between the plurality of client groups.

8. An apparatus comprising:
one or more non-transitory computer-readable storage media; and
program instructions stored on the one or more non-transitory computer-readable storage media that, when executed by a computing system, direct the computing system to at least:
monitor web traffic between a plurality of clients and at least one web server;
analyze the web traffic to determine attribute data points associated with each individual client of the plurality of clients;
create a plurality of client groups by comparing the attribute data points associated with each individual client, wherein the plurality of client groups are created based on similarities in the attribute data points among each individual client to allow classification and detection of malicious automation tools;
assign each individual client of the plurality of clients to one or more of the plurality of client groups;
identify a client of the plurality of clients as malicious when the client is included in more than one of the plurality of client groups; and
block the client identified as malicious from connecting to the at least one web server.

9. The apparatus of claim 8 wherein the program instructions, to direct the computing system to compare the attribute data points to define the plurality of client groups, direct the computing system to generate individual fingerprints for each individual client by encoding the attribute data points associated with each individual client into numerical vectors for each individual client and process the individual fingerprints to define the plurality of client groups.

10. The apparatus of claim 9 wherein the program instructions, to direct the computing system to process the individual fingerprints to define the plurality of client groups, direct the computing system to calculate distances between the numerical vectors in multidimensional space and group the individual fingerprints based on the distances between the numerical vectors.

11. The apparatus of claim 10 wherein the program instructions, to direct the computing system to group the individual fingerprints based on the distances between the numerical vectors, direct the computing system to group the individual fingerprints based on the distances between the numerical vectors falling within a proximity threshold.

12. The apparatus of claim 8 wherein the program instructions, to direct the computing system to analyze the web traffic to determine the attribute data points, direct the computing system to analyze the web traffic to determine fields in individual hypertext transport protocol (HTTP) request headers transmitted by each individual client of the plurality of clients.

13. The apparatus of claim 12 wherein the program instructions, to direct the computing system to compare the attribute data points to define the plurality of client groups, direct the computing system to determine an order of the fields listed in each of the individual HTTP request headers transmitted by each individual client and group individual clients of the plurality of clients associated with ones of the individual HTTP request headers having similarly ordered fields to define the plurality of client groups.

14. The apparatus of claim 8 wherein the program instructions, to direct the computing system to analyze the web traffic to determine the attribute data points, direct the computing system to analyze the web traffic to determine connection behavior between each individual client of the plurality of clients and the at least one web server.

15. One or more non-transitory computer-readable storage media having program instructions stored thereon to facilitate web traffic classification, wherein the program instructions, when executed by a computing system, direct the computing system to at least:
monitor web traffic between a plurality of clients and at least one web server;
analyze the web traffic to determine attribute data points associated with each individual client of the plurality of clients;
create a plurality of client groups by comparing the attribute data points associated with each individual client, wherein the plurality of client groups are created based on similarities in the attribute data points among each individual client to allow classification and detection of malicious automation tools;
assign each individual client of the plurality of clients to one or more of the plurality of client groups;
identify a client of the plurality of clients as malicious when the client is included in more than one of the plurality of client groups; and
block the client identified as malicious from connecting to the at least one web server.

16. The one or more non-transitory computer-readable storage media of claim 15 wherein the program instructions, to direct the computing system to compare the attribute data points to define the plurality of client groups, direct the computing system to generate individual fingerprints for each individual client by encoding the attribute data points associated with each individual client into numerical vectors for each individual client and process the individual fingerprints to define the plurality of client groups.

17. The one or more non-transitory computer-readable storage media of claim 16 wherein the program instructions, to direct the computing system to process the individual fingerprints to define the plurality of client groups, direct the computing system to calculate distances between the numerical vectors in multidimensional space and group the individual fingerprints based on the distances between the numerical vectors.

18. The one or more non-transitory computer-readable storage media of claim 17 wherein the program instructions, to direct the computing system to group the individual fingerprints based on the distances between the numerical vectors, direct the computing system to group the individual fingerprints based on the distances between the numerical vectors falling within a proximity threshold.

19. The one or more non-transitory computer-readable storage media of claim 15 wherein the program instructions, to direct the computing system to analyze the web traffic to determine the attribute data points, direct the computing system to analyze the web traffic to determine fields in individual hypertext transport protocol (HTTP) request headers transmitted by each individual client of the plurality of clients.

20. The one or more non-transitory computer-readable storage media of claim 19 wherein the program instructions, to direct the computing system to compare the attribute data points to define the plurality of client groups, direct the computing system to determine an order of the fields listed in each of the individual HTTP request headers transmitted by each individual client and group individual clients of the plurality of clients associated with ones of the individual HTTP request headers having similarly ordered fields to define the plurality of client groups.

\* \* \* \* \*